United States Patent [19]
Bond et al.

[11] 3,944,637
[45] Mar. 16, 1976

[54] INCREASING THE YIELD OF CAST PLASTIC LENSES

[75] Inventors: Herbert M. Bond, Stillwater; Daniel L. Torgersen, St. Paul, both of Minn.

[73] Assignee: Buckbee-Mears Company, St. Paul, Minn.

[22] Filed: Feb. 11, 1974

[21] Appl. No.: 441,645

[52] U.S. Cl. .............. 264/1; 260/80.81; 264/300; 264/331; 351/160
[51] Int. Cl.² .......................................... B29D 11/00
[58] Field of Search ................ 264/1, 300, 331; 260/80.81, 29.6 TA, 80.8, 77.5 D; 351/160

[56] References Cited
UNITED STATES PATENTS

| | | | |
|---|---|---|---|
| 2,542,386 | 2/1951 | Beattie | 264/1 |
| 3,422,168 | 1/1969 | Bowser | 264/1 |
| 3,465,076 | 9/1969 | Asami et al. | 264/1 |

*Primary Examiner*—Robert F. White
*Assistant Examiner*—Gene Auville
*Attorney, Agent, or Firm*—Jacobson and Johnson

[57] ABSTRACT

A terpolymer plastic lens having equal or greater light transmission, greater hardness and scratch resistance equal to the monomers used in prior art plastic lenses is obtained by the co-polymerization of diethylene glycol bis (allyl carbonate), methyl methacrylate and methacrylic acid or acrylic acid.

4 Claims, No Drawings

INCREASING THE YIELD OF CAST PLASTIC LENSES

BACKGROUND OF THE INVENTION

This invention relates generally to a cross-linkable terpolymer that is polymerized and solidified by heat curing and, more specifically, to a terpolymer suitable for use as lenses in eye glasses.

DESCRIPTION OF THE PRIOR ART

Plastic lenses are old in the art and conventionally have been made from polycarbonate resins such as diethylene glycol bis (allyl carbonate) which is known commercially in its monomeric form as allyl diglycol carbonate and in either its monomeric or polymerized form as CR-39. It therefore should be understood that the use of any of these terms are commonly accepted identifying the same monomer by those in the art.

Because of the clarity, high strength and high impact resistance of CR-39, it is suitable for use in plastic lenses for eye glasses. The CR-39 is not only suitable for lenses for eye glasses but is widely preferred and virtually exclusively used because of its high resistance to discolorization and its resistance to warping or distortion. A more complete description of this type of monomer and the manufacture of this type of plastic lenses can be found in the prior art Beattle U.S. Pat. No. 2,542,386. Still another material used for lenses for eye glasses is described in the prior art Emerson et al U.S. Pat. No. 3,297,422 which suggests the use of methyl methacrylate monomer. Still other copolymers of methyl methacrylate and CR-39 are known.

The present invention relates to improvements in plastic lenses by the discovery that a terpolymer of allyl diglycol carbonate, a saturated alkyl ester of methacrylic acid such alkyl group having from between one and twelve carbon atoms in the chain, and an acid selected from the group consisting of methacrylic acid and acrylic acid produce polymers useful as lenses which are capable of being mass produced as well as having improved characteristics over the prior art monomer and co-polymer lenses.

While the manufacture of formulation of a composition of a monomer for preparing a lens is well known, the process for mass production of a lens comprised of a polymer consisting of two or more monomers has been extremely difficult due to the problem of erratic release of the plastic lens from the glass mold. The problem of release involves the control of the adherence of the surface of the plastic lens to the surface of the mold. To obtain high yields, the adherence of the surface of the plastic lens to the surface of the glass mold must be sufficient to hold the plastic lens to the glass mold through the curing stage, but weak enough to allow easy separating after curing.

In order to manufacture plastic lenses for optical use, one usually casts the plastic lens in a glass mold which has the desired curvature therein. One of the problems with the use of two or more monomers to form a plastic lens is that it has been extremely difficult to control the release of the lens from the glass mold. One prior art method used to control the release is the use of surface lubricants such as stearic acid or Ortholeum 162 (tradename). However, to date, the known lubricants of this type have not provided the consistent release of the lenses from the mold and consequently the yield has been poor. That is, there is a tendency of the lens to release erratically from the mold by either releasing from the mold too soon or not releasing at all. If the lens releases too soon, i.e., before the curing is completed, the lens may crack thus rendering the lens unsuitable for optical purposes. On the other hand, if the lens does not release easily after curing, one can ruin both the plastic lens and the glass mold by attempting to physically separate the plastic lens from the glass mold. In either case, the lens may be ruined and rendered unsuitable for use as a plastic lens for eye glasses. The strange part of this phenomena of release is that the use of additives which are known to act as lubricants by decreasing the adherence of the surface of the glass mold to the surface of the plastic do not yield consistent results. That is, the amount of lubricant can be held constant with identical polymers and in one case the lens may not release from the mold and in the other case the lens may release from the mold prior to completion of the curing. Thus, while the lens is of optical quality without this third monomer, one cannot obtain high consistent yields unless the third monomer is used.

The present invention is the discovery that the addition of acrylic acid or methacrylic acid in minor amounts produces a terpolymer that still has the desired optical qualities for use in eye glasses yet provides high yields because the lens consistently releases from the surface of the glass mold at the proper time or can easily be forced to release. The consistent release is somewhat surprising in that the acrylic and methacrylic acid are believed to increase the adherence of the surface of the glass mold to the surface of the plastic lens. It will be recalled that one aspect of the problems was the tendency of the surface of the glass mold to adhere too strongly to the surface of the plastic lens. Nevertheless, the addition of the third monomer in the polymeric mass has been found to solve both the problem of pre-release or over-adherence of the lens to the mold. A further advantage is that the use of methacrylic acid as a third monomer has been found to increase the hardness of the lens without having any adverse effects on the other optical properties of the lens such as abrasion resistance and optical clarity.

Summary of the Invention

Briefly, the invention comprises the discovery that one can mass produce plastic lenses with high yields without sacrificing the optical characteristics of the lens.

In another feature, the invention comprises the discovery that the addition of ½ to 5% by weight of an acid selected from the group consisting of acrylic acid and methacrylic acid to a reactant mixture lens comprised of allyl diglycol carbonate and methyl methacrylate consistently yields lenses of optical quality.

Description of the Preferred Process

While increasing the concentration of methyl methacrylate produces improvements in certain physical parameters, notably impact resistance, tensile strength and hardness, other factors which are not readily measurable have demonstrated that if the methyl methacrylate is about 10 to 12% by weight and the allyl diglycol carbonate comprises the balance of about 90 to 88% by weight, we obtain a lens of superior optical quality if we maintain the concentration of the copolymers within this range. The basis for the above percentage being suitable for plastic lenses is based primarily on visual inspection and interpretation of abrasion tests. That is, there are various types of abrasion resistance tests that can be performed on the plastic lens, however, none of them are very well suited for measuring the scratch or abrasion resistance of a lens under actual use. It has been found that one of the most simple tests, namely, lightly rubbing a pencil eraser over the surface of the lens a predetermined number of times produces the best indication of the scratch resistance of a lens in actual use. While no absolute measurements of the abrasion resistance are obtained, one can make a fairly accurate visual comparison between different lenses. It is this analysis that has led to the determination that a lens having about 10 to 12% methyl methacrylate and balance of about 90 to 88% by weight of diethylene glycol bis (allyl carbonate) is the most preferred polymer for use in eye glasses because of the excellent optical characteristics. Nevertheless, a plastic lens having as low as 0% methyl methacrylate to as high as 50% methyl methacrylate has optical characteristics which allow it to be used as a plastic lens.

The heart of the present invention involves the discovery that adding a third monomer selected from the group consisting of acrylic acid and methacrylic acid to form a terpolymer with allyl diglycol carbonate and methyl methacrylate does not have a detrimental effect on the optical characteristics of the plastic lens yet it eliminates the problems of erratic release of the lens from the mold to allow one to mass produce the plastic lenses.

In order to more fully describe the process, the following examples are included herewith.

Typically, the lenses are cast in blanks which are approximately ¼ inch thick and have a diameter of about 2½ inches with one surface convex and the other surface concave. This particular shape is required so that the lens blank can be ground to the proper prescription. The casing of this shape lens with monomers such as CR-39 is shown and described in the prior art Beattle U.S Pat. No. 2,542,386.

EXAMPLE 1

In order to manufacture a lens suitable for use in an eye glass, one prepares and mixes a solution of 12 parts by weight of methyl methacrylate containing 1.25% by weight of benzoyl peroxide and 0.15% by weight of a UV absorber such as p-methoxybenzylidene malonic acid dimethyl ester. After the solution has been mixed it is dried by placing about 50 grams of anhydrous sodium sulfate per 1000 ml of solution. Typically, a minimum of 50 grams of anhydrous sodium sulfate per 500 ml of solution is sufficient to remove any water which may be in the solution. Next, one vacuum filters the solution through filter paper to remove the sodium sulfate. Next, 10 parts per million (by weight) of a lubricant such as Ortholeum 162 are stirred into the solution. At this point a reactant mixture is prepared containing the 12 parts by weight of the solution of methyl methacrylate, 88 parts by weight of diethylene glycol bis (allyl carbonate) and with ½% of acrylic acid being stirred into the solution. The solution and the container are then placed in a vacuum chamber where the air is removed. This serves to remove the air bubbles in the solution thus eliminating the possibility of the plastic lens having internal air bubbles. Next, the evacuated container is pressurized with nitrogen at about 15 psi. After pressurizing the container with nitrogen the solution is then forced under pressure into the molds. Once the solution is in the molds the mold is placed in an oven at 65° C. for a minimum of about 3 hours followed by raising the temperature from 65°–75° C. in a minimum of about 4 hours which is followed by raising the temperature from 75° C. to 100° C. in a minimum of about 10 hours, whereupon the molds are removed from the oven and allowed to cool at room temperature.

EXAMPLE 2

Additional lenses were cast according to the process of Example 1 except that the amounts of acrylic acid present were increased up to 5.0% by weight by using .5%, 1%, 1.5%, 1.65%, 1.75%, 1.85%, 2.0%, 3.0% and 5.0% acrylic acid. In all cases the plastic lens exhibited optical characteristics as good or better than copolymers and without any problems of pre-release from the mold or adherence of the lens to the mold except in the case of 5.0% acrylic acid which adhered very strongly to the mold.

EXAMPLE 3

Additional lenses of Example 2 were repeated with the exception that methacrylic acid was utilized in lieu of the acrylic acid. The amounts of methacrylic acid were .5%, 1%, 1.5%, 1.65%, 1.75%, 1.85%, 2.0%, 3.0% and 5.0%. The lenses all exhibited excellent optical characteristics without pre-release from the mold or adherence to the mold except in the case of 5.0% methacrylic acid which was slightly yellow and released with difficulty. In addition, the lens containing methacrylic acid in the polymer generally had a hardness of 12.5 to 13 based on a diamond pyramid hardness using 500 grams with a 136° diamond head. Approximately 500 lenses were cast according to Example 1, Example 2 and Example 3 without a single failure due to pre-release or over adherence of the lens to the mold.

EXAMPLE 4

Additional lenses were cast according to the process of Examples 1 and 2 except that the methyl methacrylate component in the methyl methacrylate allyl diglycol carbonate portion of the terpolymer ranged from 10 to 50% in 10% graduations and the allyl diglycol carbonate balance ranged from 90 to 50%. No adverse effect of optical characteristics as a result of the acrylic or methacrylic acid were observed yet the yield was in excess of 99%.

In order to obtain a clean release of the lens from the mold, initially only a lubricant was added to the mixture. Typical well known lubricants for use in such an application are the mono alkyl phosphates and the dialkyl phosphates or the mixtures thereof which are sold under the tradenames Ortholeum 162 or Zelec U.N. Another suitable lubricant is not necessary to the invention to enhance the optical characteristics of the lens for eye glasses but merely aids in stripping the lens from the mold. In fact, impurities in the mixutre such as dirt or dust which may be present in the solution can also act as a lubricant to assist in release of the lens from the mold, however, these types of lubricants are generally not desirable because of the residue that remains in the lens, however, the lubricant alone has not been sufficient to produce high yields.

Further tests were also conducted in which the lubricant was varied from 0 parts per million to 25 parts per million. With less than 6 parts per million of lubricant there was a greater tendency of the polymerized lens to adhere to the mold causing difficulty in removing the mold from the polymerized lens and with lubricants less than 2 parts per million the number of pullouts greatly increased. However, the lens itself was still of optical quality if the mold could be carefully stripped from the lens. While it has been found that no particular lubricant produces better release from the mold, it has been found that using a lubricant in excess of 20 parts per million may cause pre-release of the lens from the mold which renders the polymerized lens unsuitable for optical use.

Even after the use of lubricants in the preferred range, it was found that the yield of usable lenses was less than acceptable because of lack of consistency. That is, the cost per usable lens was sufficiently high so as to render the process and lens too costly except for custom use. At this point, we discovered that we could increase the yield of the lens by adding a third monomer to the mixture. The benefits from the addition of the third monomer were threefold; the first being there was no adverse effect on the optical characteristics of the lens such as clarity, hardness or abrasion resistance; the second benefit was that the hardness actually increased about one unit with the third monomer; and the third benefit was that the yield of usable lens was in excess of 99% as opposed to about 50% without the third monomer.

Generally, to manufacture our improved lenses the polymerization mixture is prepared by mixing the allyl diglycol carbonate monomer with the methacrylate ester and a catalyzer such as benzoyl peroxide, acetyl peroxide or isopropyl percarbonate. However, the benzoyl peroxide catalyst is preferred because it produces a substantially harder lens when used with the preferred ratio of the two monomers. More specifically, a suitable range of benzoyl peroxide is about 1.0 to 1.5% by weight with 1.25% by weight of the total polymer mixture being optimum. While we have described our preferred amount of catalyst, it should be understood that more or less amounts of catalyst will work but that the terpolymer does not consistently meet the characteristics required for clear, hard, plastic lenses if the amount of catalyst is increased or decreased beyond the preferred ranges.

Generally, all plastics are damaged in one way or another by degradation due to the ultra violet portion of the light radiation from the sun. However, our polymer mixture is suitable for use in eye glasses without any UV absorbers but in the event further long term protection against degradation is desired, UV absorbers are available for incorporation in the reactant mixture. Typically, the UV absorbers are added in small concentration of less than one-half percent. Examples of some well known compounds used as UV absorbers are benzophones, benzotriazoles, substituted acrylonitriles and phenol-nickel complexes. In the present invention it is preferred to use p-methoxybenzylidene malonic acid dimethyl ester as a UV absorber preferably in an amount of about 0.2%.

EXAMPLE 5

Further tests were conducted in accordance with the procedure of Example 1 in which the only components of the mixture were the diethylene glycol bis (allyl carbonate) $O[CH_2CH_2OCOO(C_3H_5)]_2$, methyl methacrylate $CH_2{:}C(CH_3)COOCH_3$ an acid selected from the group consisting of acrylic acid and methacrylic acid, and benzoyl peroxide $(C_6H_5CO)_2O_2$. In these tests the amounts of diethylene glycol bis (allyl carbonate) present in the diethylene glycol bis (allyl carbonate) methyl methacrylate portion were varied from 50 to 90% in 10% increments and the methyl methacrylate balance was varied from 10 to 50% with the catalyst benzoyl peroxide being varied from 1.0 to 1.5% by weight of the mixture of methyl methacrylate and diethylene glycol bis (allyl carbonate). The acrylic acid and methacrylic acid ranged from ½ to 5% by weight of the mixture. The lenses produced were of the same optical quality as those with either the lubricant or the lubricant and the UV absorber. However, the yield of lenses without the lubricant was not equal to the yield with lubricants.

We claim:

1. In the process of preparing a polymerized lens in a glass mold by preparing a reactant mixture of methyl methacrylate, diethylene glycol bis (allyl carbonate) and an acid selected from the group consisting of acrylic acid and methacrylic acid, which method comprises: preparing a monomer mixture of methyl methacrylate and diethylene glycol bis (allyl carbonate) wherein the methyl methacrylate monomer ranges from about 10 to about 50% by weight of the monomer mixture, balance diethylene glycol bis (allyl carbonate); adding to said monomer mixture a lubricant and a catalyst of benzoyl peroxide ranging from between about 1 to 1.5% by weight of the monomer mixture; exposing said reactant mixture to a thermal treating zone to polymerize said reactant mixture and form a terpolymer therefrom with the improvement comprising adding to said monomer mixture an acid selected from the group consisting of acrylic acid and methacrylic acid, with said acid ranging from between about ½ to 5% by weight of said monomer mixutre.

2. The process as set forth in claim 1 being particularly characterized in that a lubricant is added to said reactant mixture prior to polymerization thereof, and wherein said lubricant is selected from the group consisting of mono and dialkyl phosphates having from between about 16 and 18 carbon atoms in the alkyl radical, and stearic acid, said lubricant being present in said reactant mixture in a quantity of less than about 20 ppm.

3. The process as set forth in claim 1 wherein said treating zone increases the temperature of said reactant mixture slowly until a temperature of about 100°C. is reached.

4. The process as set forth in claim 1 being particularly characterized in that said acid is methacrylic acid, and is present in said reactant mixture in an amount greater than ½% by weight of the reactant mixture.

* * * * *